United States Patent [19]

Otsuka et al.

[11] 4,216,667
[45] Aug. 12, 1980

[54] METHOD OF FORMING A TAPER LEAF

[75] Inventors: Shoichi Otsuka, Hachioji; Takashi Fukui, Chiba, both of Japan

[73] Assignee: Horikiri Spring Manufacturing Co., Ltd., Yachiyo, Japan

[21] Appl. No.: 957,026

[22] Filed: Nov. 2, 1978

[30] Foreign Application Priority Data

Dec. 23, 1977 [JP] Japan .............................. 52-155280

[51] Int. Cl.² ............................................ B21B 1/42
[52] U.S. Cl. ...................................... 72/366; 29/173; 72/240
[58] Field of Search ......................... 29/156.8 B, 173; 72/365, 366, 240

[56] References Cited

U.S. PATENT DOCUMENTS

| 2,608,752 | 9/1952 | Schilling | 29/173 |
| 3,153,844 | 10/1964 | Roth | 29/173 |
| 3,793,868 | 2/1974 | Wilson | 72/366 |

Primary Examiner—Lowell A. Larson
Attorney, Agent, or Firm—Fleit & Jacobson

[57] ABSTRACT

A method of forming a taper leaf for use in a laminated spring wherein pre-tapering work is first performed by which a terminal portion of a sheet of spring material is transformed in its lateral direction so as to become thinner toward the tip while maintaining the vertical thickness of the sheet or section at the original thickness of the material. Subsequently, the same portion is rolled for tapering in a vertical direction.

5 Claims, 14 Drawing Figures

METHOD OF FORMING A TAPER LEAF

BACKGROUND OF THE INVENTION

Field of the Invention

This invention relates to a method of forming a taper leaf for use in a laminated spring by means of rolling a sheet of spring material.

A taper leaf to be used in a laminated spring is formed in such a taper shape that the terminal portion of a flat plate becomes gradually thinner in its vertical thickness toward its tip. According to a conventional method of forming such a taper leaf, a sheet of spring material, generally designated 1, as shown in FIGS. 1 and 2, is first heated and then its terminal portion 1a is rolled for tapering in its vertical thickness direction. According to this method, the shape after the tapering work is such that the material is rolled to spread out in its lateral direction. Therefore, a measure of breadth trimming cutting or a measure of grinding and abrading (implying also shaving and abrading, hereunder being so meant) has to be applied to the parts spreading out in the lateral direction. That is, in FIGS. 1 and 2, the shape of the terminal portion 1a of the sheet of spring material before being rolled for tapering is as indicated by the broken lines. On the other hand, in the condition that the terminal portion 1a has been rolled for tapering in the vertical thickness direction, broad spreading parts 1b are formed in the lateral direction in the taper-rolled portions, as indicated by the solid lines. Inasmuch as this is inconvenient for the next process of piling and binding the respective leaves, these spreading parts have to be removed by means of breadth trimming cutting, trimming, cutting, grinding, abrading, or erasing.

Another known method utilizes compression of the terminal portion 1a prior to performing the rolling for tapering. This method attempts to reduce the required amount of trimming cutting and the required amount of grinding and abrading. As illustrated in FIGS. 3 and 4, this method pushes molds 2 of predetermined shape onto both sides of the material 1 in order to make the terminal portion 1a of the material have a tapered shape. Thus, the size of the spreading parts 1b, which spread out in the lateral direction during rolling for tapering, is reduced. However, with the press compression process, the vertical thickness of the material increases, or as illustrated in FIG. 4, the material 1 curves in an arcuate shape. Thus, spreading in the lateral direction still occurs during the final rolling for tapering. Therefore, edge trimming cutting and grinding and abrading are still required.

Thus, it is required in the conventional method to apply the process of removing the spreading parts 1b after the rolling for tapering in the vertical thickness direction, and, according to positions to be removed, it is required to slice the material 1 very thinly for breadth trimming. However, this process is difficult from a technical viewpoint and is not economical as too much material is wasted. On the other hand, in case of applying the operation of grinding and abrading instead of the operation of breadth trimming cutting, the working time is so long as to present hindrance to the mass production process. Further, since the parts subjected to the above-mentioned operation of breadth trimming cutting or grinding and abrading from edges, an edge rounding operation is required to avoid unfavourable effects on the performance of a spring formed from the parts. Thus, the conventional methods of forming a taper leaf possess various defects.

SUMMARY OF THE INVENTION

The present invention is intended for eliminating the previously discussed defects with previously known methods. A primary objective of the present invention is to furnish a method of forming a taper leaf according to which pre-tapering work is to be performed for making the terminal portion of the material have a shape tapering in its lateral direction toward its tip, while maintaining the vertical thickness of the material the same as before, and thereafter, said portion is to be subjected to rolling for tapering in its vertical thickness direction so that expanded parts spreading out of the optimum breadth at the time of executing the rolling for tapering do not emerge. Thus, the method of the present invention makes it unneccessary to apply the operation of cutting off the superfluous expanded parts for breadth trimming or the operation of grinding and abrading. Advantages obtained include overall simplification of the working process, facilitation of processing techniques, shortening of working time, and facilitation and quickening of the production of taper leaves.

Another objective of the present invention is to furnish a method of forming a taper leaf according to which economical mass production and efficient manufacture of taper leaves becomes possible, inasmuch as the process of removing superfluous expanded parts by grinding and abrading is not needed, and the material is not wasted.

A still further objective of this invention is to furnish a method of forming a taper leaf according to which, by employing a pair of rollers having a shape of Japanese hand drum (see FIG. 12) in the above-mentioned pre-tapering process, the respective edges of the terminal portion of the material in the longitudinal direction can be rounded off with fixed curving radii so that unfavourable effects on the performance of the spring due to the edges do not occur, and the conventional operation of rounding the edges can be eliminated.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because methods of forming taper leaves are well known, the present description will be directed in particular to elements forming part of, or cooperating more directly with, the present invention. Elements not specifically shown or described herein are understood to be selectable from those known in the art.

Figure 1:
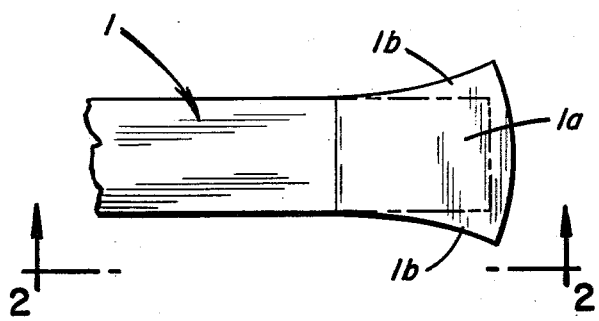
FIG. 1 illustrates a sheet of spring material after a first shaping operation of a previously known method.
Figure 2:
FIG. 2 is a view taken along line 2—2 of the sheet of FIG. 1.
Figure 3:
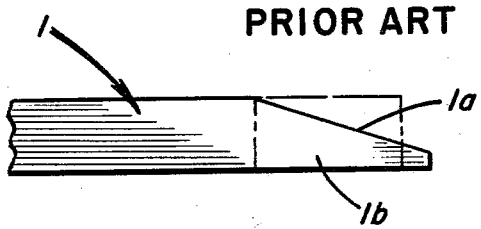
FIG. 3 is a schematic diagram of a device used in another previously known method for forming a taper leaf.
Figure 4:
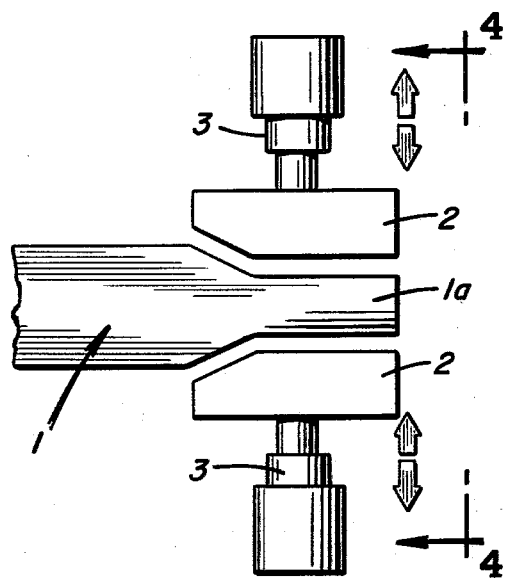
FIG. 4 is a view taken along line 4—4 of FIG. 3.
Figure 5:
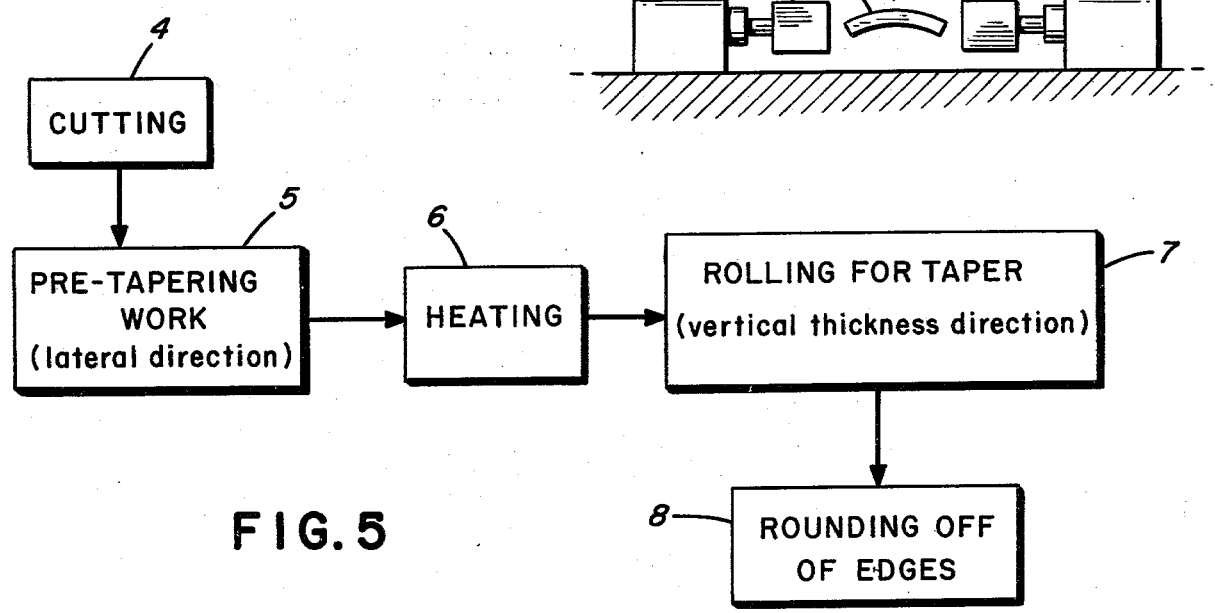
FIG. 5 is a block diagram showing the production process of the present invention.

Turning now to the drawings and to FIG. 5 in particular, the present invention will be described in detail.

According to the present invention, a strip or sheet of spring material is to be rolled or shaped to form a taper leaf for use in a composite sheet spring. The taper leaf has a predetermined breadth and a desired length. As illustrated by Block 4, the steel material is first cut to obtain a piece of material 1 having a desired length. Next, the terminal portion 1a (the portion turning out to be taper portion finally) of the material 1 is subjected to pre-tapering work in a lateral direction by a device schematically illustrated as Block 5. The terminal portion 1a thus becomes thinner towards the tip, while maintaining the vertical thickness of the portion at the original thickness of the material. The terminal portion 1a, after being subjected to the pre-tapering work, is heated (as schematically illustrated by Block 6) and rolled for tapering in its vertical thickness direction (as schematically illustrated by Block 7). Finally, the operation of rounding off the edges (as schematically illustrated by Block 8), forms a taper leaf having the desired shape. As to the pre-tapering work, (Block 5), this operation utilizes a method of grinding and abrading, a method of rolling with rollers, or a combination of the two methods.

Next, the above processes or operations will be described in more detail.

After the cutting process (Block 4) and prior to the taper rolling of the sheet spring material in the vertical thickness direction, the amount of the lateral expansion at the time of the taper rolling is pre-estimated according to the following formula (1):

$$\Delta B = C \times (\Delta h / h_o) \tag{1}$$

In the formula, $\Delta B$ is the amount of lateral expansion at the time of taper rolling in the vertical thickness direction; $\Delta h$ denotes the difference between the vertical thickness of the sheet $h_o$ before the taper rolling and the vertical thickness of the sheet $h_1$ after the rolling, i.e., the amount of pressing down; and C denotes a fixed number established by the rolling condition. Preferably, C has a value of approximately 0.4.

The amount of expansion of the material 1 in the lateral direction, at the tapering of the material 1 in the vertical thickness direction, is affected by the size of the diameter of the employed roll, the amount of pressing down, the ratio of rolling, the temperature of heating of the material 1, etc. However, the above formula (1) is an empirical formula obtained from the actual manufacturing experiences.

Figure 6:
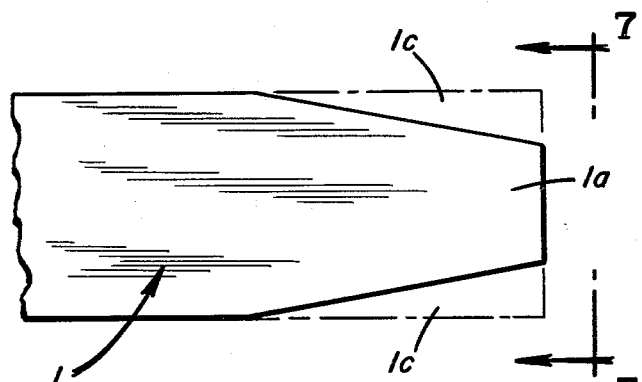
FIG. 6 is a top view of a sheet of spring material after the pre-tapering process used in the present invention.
Figure 7:
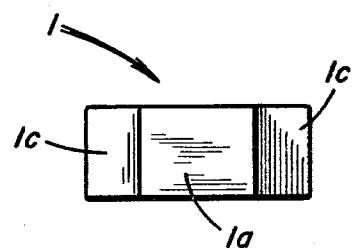
FIG. 7 is a view taken along line 7—7 of FIG. 6.

Once the tip portion 1a of the material 1 in the lateral direction, as shown by broken lines in FIG. 6, to be ground, ground and abraded, shaved, shaved and abraded, abraded, cut or removed has been estimated according to the formula (1), a milling cutter, shaped or planer is then used to form the desired shape, as shown by solid lines in FIGS. 6 and 7, in order to make a taper shape of left-right symmetry relative to the central line in the longitudinal direction.

Figure 8:
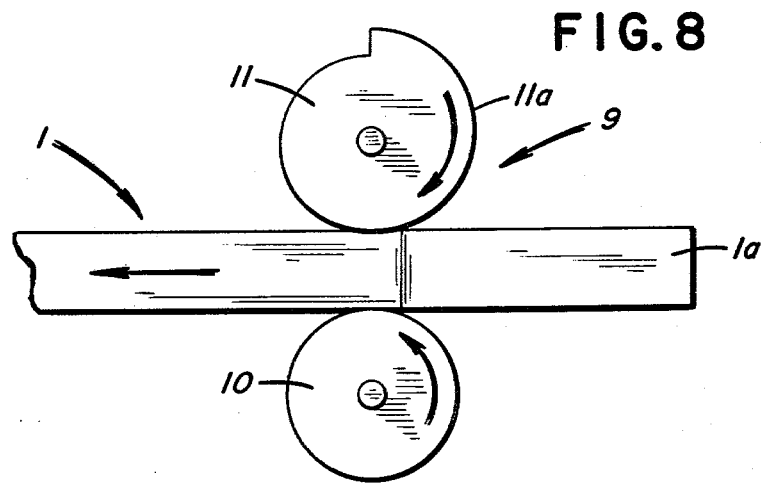
FIG. 8 is a front elevational view of one embodiment of a device for rolling for tapering.
Figure 9:
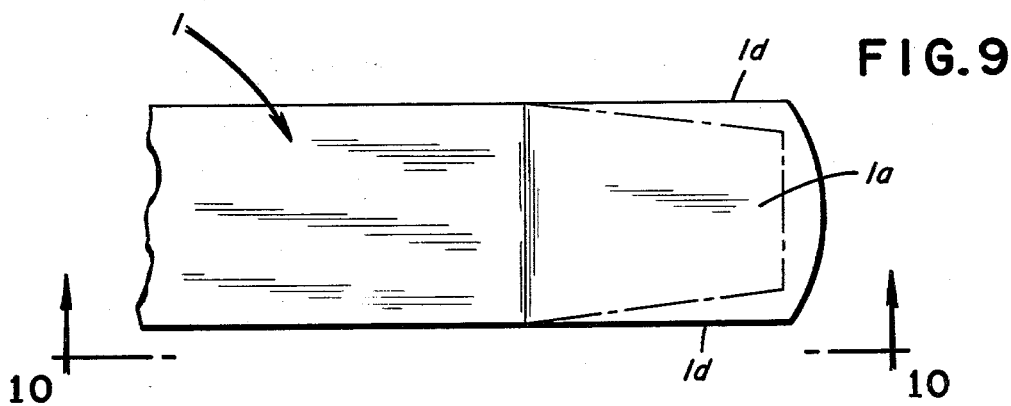
FIG. 9 is a top plan view of a sheet of spring material that has been rolled for tapering according to the method of the present invention.
Figure 10:
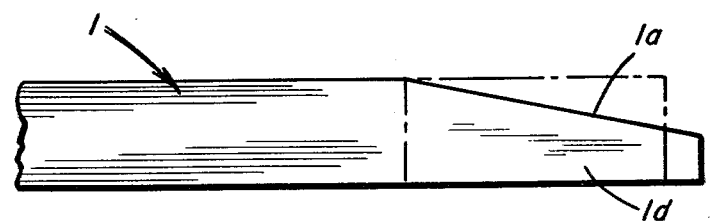
FIG. 10 is a view taken along line 10—10 of FIG. 9.

After performing the pre-tapering work by means of the above-mentioned grinding and abrading, the terminal portion 1a of the worked material 1 is heated (Block 6) to about 950° C. Taper rolling is then executed (Block 7) by means of taper rolling apparatus 9. This apparatus is explained briefly referring to FIG. 8 as follows. A receiving roller 10 and an eccentric roller 11 installed in oppositely facing separated positions are rotated in the directions of the arrows by means of a driving mechanism (not shown). Eccentricity is provided by gradually enlarging the radius of the circumferential surface 11a of the roller 11. The material 1 with the terminal portion 1a, after being pre-tapered and heated, is pressed into and passed between the rollers 10 and 11 which rolls the terminal portion 1a of the material 1 to taper in the vertical thickness direction, as shown by the solid lines in FIGS. 9 and 10. The breadth of the terminal portion 1a is gradually expanded and extended outward. However, since both sides of the terminal portion have before hand been ground, abraded, cut and removed, as shown by the broken lines, both sides 1d of the terminal portion 1a are gradually formed on the lines elongated from the side lines of the central portion of the material and do not extend outward from these lines. Thus, both sides of the spring leaf are formed generally in parallel throughout. Finally, the rounding process (Block 8) is applied to the edge parts thereby completing the formation of the taper portion.

When being formed in this way, the shape after the taper rolling of the terminal portion 1a of the material 1 is formed generally uniformly throughout as mentioned above, and the terminal portion 1a does not expand and extend outward unnecessarily in the lateral direction. Therefore, the breadth trimming cutting or the grinding and abrading operation required in the previously known method need not be applied to the parts which have expanded and extended outward after the tapering process.

It is a matter of course that the pre-tapering work may be performed in the lateral direction by employing rolling rollers instead of the taper formation in the lateral direction by means of the above-mentioned grinding and abrading. In this case, after the cutting process (Block 4), the terminal portion 1a of the material 1 which is to become the taper portion is heated. Thereafter, the terminal portion 1a is squeezed and pressed from both sides in the lateral direction by means of both rolling rollers, and by gradually increasing the squeezing force of both rolling rollers, in accordance with the advance of the material 1, the taper in the lateral direction is formed.

Figure 11:
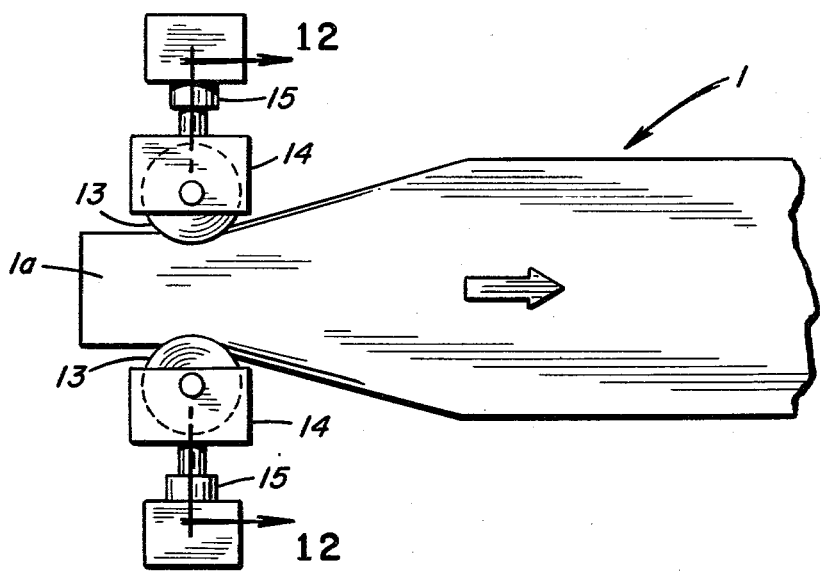
FIG. 11 is a top plan view of one embodiment of an apparatus utilizing rolling with rollers to perform pre-tapering work.
Figure 12:
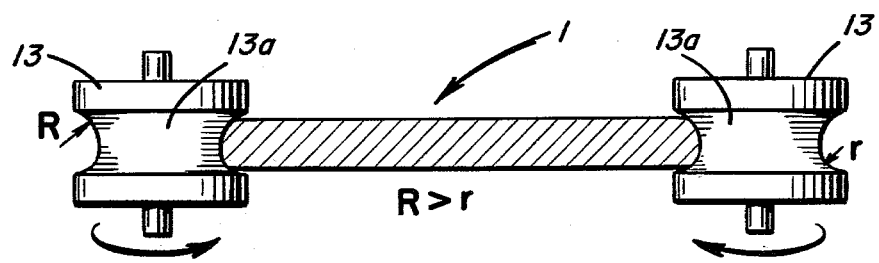
FIG. 12 is an enlarged view taken along line 12—12 of FIG. 11.
Figure 13:
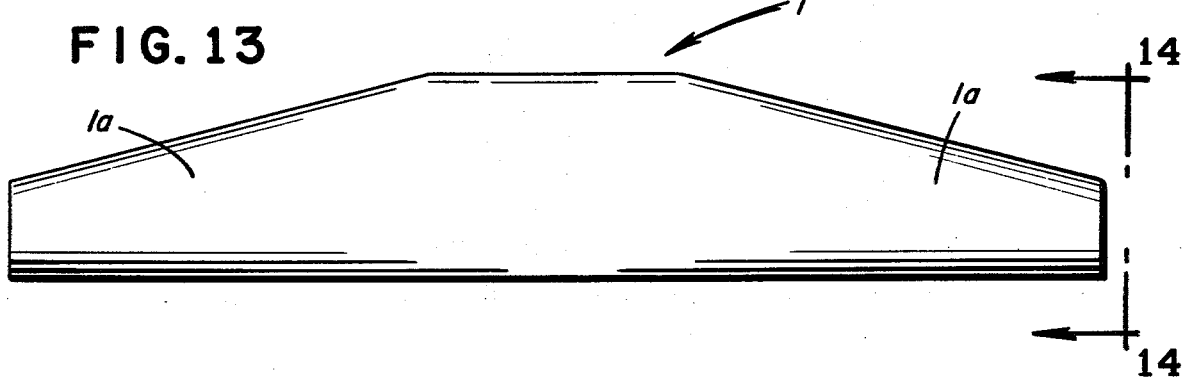
FIG. 13 is a front view of a taper leaf which has been rolled for tapering, after having been subjected to pre-tapering work.
Figure 14:
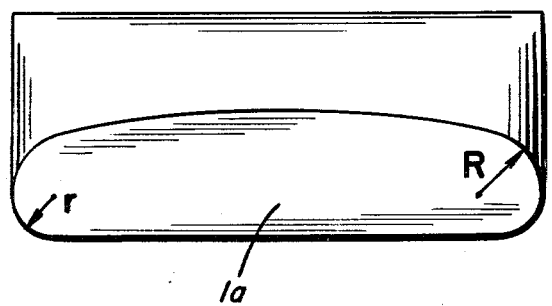
FIG. 14 is a view taken along line 14—14 of FIG. 13.

The above-mentioned rolling rollers may be rollers of perfectly circular shape in section. However, instead of such rollers, rolling rollers of Japanese hand drum shape may be employed. The taper rolling apparatus of this type will be explained with reference to FIGS. 11 and 12. A pair of rolling rollers 13, of Japanese hand drum shape, are so formed that the bottom portion 13a of the concaves are hollowed circularly. Each of the rollers 13 is rotatably mounted in a housing 14 which is movable by a piston 15 towards and away from the longitudinal center line of the material 1. Both sides, in the lateral direction of the material 1, are pushed between the rolling rollers 13 of Japanese hand drum shape. When the pushing is made to such a degree that the initial edges of the terminal portion 1a of the material 1 are located between the rollers, the rollers 13 are moved towards each other simultaneously with the advance of the terminal portion 1a through the rollers. Thus, the terminal portion 1a of the material 1 is subjected to the pre-tapering work to have a taper shape becoming thinner toward the tip in the lateral direction, and simultaneously round outlines are added to the sides in the longitudinal direction in correspondence with the bottom portions 13a of the rolling rollers 13. Therefore, when it is taper-rolled in the vertical thickness direction (Block 7), the respective edge parts in the terminal portion 1a are transformed to round shapes having, respectively, curvature radii R and r. As to said curvature radii R and r, if denoting R as the radius at the compression side (upper side) of the sheet spring and denoting r as the radius of the lower side, the relation R>r, is desirable in view of the life span of the spring.

According to the above forming method, edge parts are not formed at the time of taper rolling (Block 7), so that the final work process (the process of rounding off the edges) in the method incorporating the taper formation in the lateral direction by means of grinding and abrading, can be omitted.

If the taper formation in the lateral direction is performed by means of rolling rollers, the material 1 is elongated in the longitudinal direction at the time of rolling in the lateral direction because of the malleability of the steel material for spring. Accordingly, it is possible to cut the material shorter in the process of cutting the steel material in pieces (Block 4), if resorting to the above-mentioned method of employing rolling rollers as compared with the method of taper formation in the lateral direction by grinding and abrading, with a view to finally obtaining taper leaves of the same length. Thus, it is possible to obtain more pieces of material for springs from a given length unit of steel plate.

The ultimate rate of the elongation in the longitudinal direction due to the above-mentioned roller rollings both in the lateral direction and the vertical thickness direction is variable according to the property of the steel material for spring and the length of the taper portion. It is, however, generally about 5% of the original length of the material plate. Depending on the amount of such elongation, the rate of the elongation in the longitudinal direction at the time of roller rolling in the vertical thickness direction can almost be ignored.

As explained above in detail, the present invention makes unnecessary the process of cutting for breadth trimming or the process of grinding and abrading which are needed in the previously known method. The overall working process can also be simplified, so that production can be effected easily and quickly, and mass production becomes possible. Since the material is not used wastefully and the production is economical, taper leaves can be produced efficiently. Further, when employing rolling rollers of Japanese hand drum shape for the pre-tapering work, the edges in the longitudinal direction are rounded so that the process of rounding off the edges can be eliminated.

The invention has been described in detail with particular reference to preferred embodiments thereof, but it will be understood that variations and modifications can be effected within the spirit and scope of the invention.

We claim:

1. A method of forming a taper leaf used in a composite laminated spring comprising:
   cutting a sheet of spring material having a given thickness to a desired length;
   pre-tapering a portion adjacent to one end of the sheet so that the width of the portion tapers towards the one end of the sheet, the given thickness of the portion being maintained during pre-tapering;
   heating the pre-tapered portion prior to rolling; and
   rolling the pre-tapered portion to taper the given thickness of the pre-tapered portion towards the one end of the sheet.

2. A method according to claim 1 wherein the pre-tapered portion laterally expands during rolling and wherein the method further comprises:
   using the following formula to estimate the amount of lateral expansion:

$$B = C \times \Delta h / h_o,$$

B being the amount of lateral expansion during rolling, C being a constant having a value of approximately 0.4, $\Delta h$ being the difference in thickness before and after rolling, and $h_o$ being the thickness of the sheet before rolling; and
   pre-tapering the portion adjacent the one end at a rate corresponding to the estimated amount of lateral expansion.

3. A method according to claim 1, wherein a pair of Japanese hand drum shape rollers having parallel axes are used to pre-taper the sheet, the rollers having concave shaped central grooves contacting side edges of the sheet portion to be pre-tapered progressively moved towards each other in a direction to narrow the distance between the pair of rollers as a sheet is moved between the rollers to thereby pre-taper the sheet.

4. A method according to claim 3, wherein the grooves of the rollers are shaped to form upper and lower curved edges, each edge having a different curved radius at positions where the groove portions of the Japanese hand drum rollers abut with the edges of the sheet, the grooves forming rounded edges in the longitudinal direction so that a curved radius in a compression side may be larger than that of a tension side of a finally formed tapered portion of a leaf spring.

5. A method according to claim 1, wherein the rolling to taper the thickness of the sheet is accomplished in a single pass.

* * * * *